US010185347B2

(12) United States Patent
Knoedgen

(10) Patent No.: US 10,185,347 B2
(45) Date of Patent: Jan. 22, 2019

(54) STACKED POWER SUPPLY FOR REDUCED CURRENT CONSUMPTION

(71) Applicant: Dialog Semiconductor (UK) Limited, Reading (GB)

(72) Inventor: Horst Knoedgen, Munich (DE)

(73) Assignee: Dialog Semiconductor (UK) Limited, Reading (GB)

( * ) Notice: Subject to any disclaimer, the term of this patent is extended or adjusted under 35 U.S.C. 154(b) by 553 days.

(21) Appl. No.: 14/799,638

(22) Filed: Jul. 15, 2015

(65) Prior Publication Data

US 2016/0181800 A1 Jun. 23, 2016

(30) Foreign Application Priority Data

Dec. 18, 2014 (DE) ........................ 10 2014 226 495

(51) Int. Cl.
*H02J 1/10* (2006.01)
*H02J 3/38* (2006.01)
(Continued)

(52) U.S. Cl.
CPC ................ *G05F 3/26* (2013.01); *G05F 1/577* (2013.01); *G05F 3/16* (2013.01); *G05F 3/18* (2013.01)

(58) Field of Classification Search
CPC ..... G05F 3/26; G05F 3/18; G05F 3/16; G05F 1/577; H02J 1/10; Y10T 307/305
See application file for complete search history.

(56) References Cited

U.S. PATENT DOCUMENTS

| | | | | |
|---|---|---|---|---|
| 3,777,253 A | | 12/1973 | Callan | |
| 5,515,005 A | * | 5/1996 | Yoshioka | H03F 1/083 330/255 |

(Continued)

FOREIGN PATENT DOCUMENTS

| | | |
|---|---|---|
| CN | 1532791 | 9/2004 |
| DE | 18 06 352 | 5/1970 |

(Continued)

OTHER PUBLICATIONS

Chinese Office Action, Application No. 2015108906786, Applicant: Dialog Semiconductor (UK) Limited, dated Aug. 24, 2016, 9 pgs, and English language translation, 10 pgs.

(Continued)

*Primary Examiner* — Rexford Barnie
*Assistant Examiner* — Rasem Mourad
(74) *Attorney, Agent, or Firm* — Saile Ackerman LLC; Stephen B. Ackerman

(57) ABSTRACT

A circuit arrangement comprising a first capacitor and a second capacitor which are arranged in series between a high potential and a low potential is described. The circuit arrangement comprises first power consuming circuitry which is arranged in parallel to the first capacitor. The first power consuming circuitry (113) consumes electrical power at a first voltage. The circuit arrangement comprises second power consuming circuitry which is arranged in parallel to the second capacitor. The second power consuming circuitry consumes electrical power at a second voltage, wherein a magnitude of the sum of the first voltage and the second voltage is smaller than an absolute difference between the high potential and the low potential. The circuit arrangement sets a voltage at the first capacitor in accordance to the first voltage and to set a voltage at the second capacitor in accordance to the second voltage.

12 Claims, 5 Drawing Sheets

(51) Int. Cl.

| | |
|---|---|
| ***H02J 7/34*** | (2006.01) |
| ***G05F 3/26*** | (2006.01) |
| ***G05F 1/577*** | (2006.01) |
| ***G05F 3/18*** | (2006.01) |
| ***G05F 3/16*** | (2006.01) |

(56) References Cited

U.S. PATENT DOCUMENTS

| | | | | |
|---|---|---|---|---|
| 6,150,799 | A * | 11/2000 | Barth | G05F 1/59 323/273 |
| 6,316,917 | B1 * | 11/2001 | Ohta | H02J 7/0016 320/166 |
| 2002/0180369 | A1 | 12/2002 | Koyama | |
| 2002/0196212 | A1 | 12/2002 | Nishitoba et al. | |
| 2005/0057296 | A1 * | 3/2005 | Dharne | H03K 3/356113 327/333 |
| 2007/0257623 | A1 * | 11/2007 | Johnson | H05B 33/0818 315/193 |
| 2009/0278515 | A1 * | 11/2009 | Broussard | G05F 1/577 323/267 |
| 2015/0108909 | A1 * | 4/2015 | Rupp | H05B 33/083 315/188 |

FOREIGN PATENT DOCUMENTS

| | | |
|---|---|---|
| DE | 102012207456 | 11/2013 |
| WO | WO2013164417 | 11/2013 |

OTHER PUBLICATIONS

Chinese Office Action, Application No. 201510890678.6, Applicant: Dialog Semiconductor (UK) Limited, dated Apr. 17, 2017, 5 pgs, and English language translation, 2 pgs.

German Search Report and translation 10 2014 226 495.2, dated May 26, 2015, Dialog Semiconductor (UK) Ltd.

* cited by examiner

STACKED POWER SUPPLY FOR REDUCED CURRENT CONSUMPTION

TECHNICAL FIELD

The present document relates to a power supply for an integrated circuit (IC).

BACKGROUND

Integrated circuits may comprise different analog and/or digital functions, which need to be supplied with electrical power at possibly different voltages. A possible approach to providing the different analog and/or digital functions with electrical power is the use of dedicated power converters which are configured to provide the electrical power at the different voltages to the different analog and/or digital functions. The use of power converters leads to increased space requirements on an integrated circuit. Furthermore, the use of power converters leads to increased power dissipation of the integrated circuit.

SUMMARY

The present document addresses the technical problem of providing a power efficient and cost efficient integrated circuit which comprises a plurality of different analog and/or digital functions with different power requirements. According to an aspect, a circuit arrangement (e.g. a power supply and a plurality of power consuming circuitry) is described. The circuit arrangement may be an integrated circuit. By way of example, the circuit arrangement may comprise a driver circuit for a light emitting diode. The circuit arrangement comprises a first capacitor and a second capacitor which are arranged in series between a high potential (e.g. a supply voltage Vcc) and a low potential (e.g. ground). Furthermore, the circuit arrangement comprises first power consuming circuitry (e.g. digital circuitry) which is arranged in parallel to the first capacitor. The first power consuming circuitry consumes electrical power at a first voltage. The first power consuming circuitry may comprise one or more electronic components, e.g. digital components such as logical gates, wherein the one or more electronic components are operated at the first voltage.

In addition, the circuit arrangement comprises second power consuming circuitry (e.g. an analog circuit) which is arranged in parallel to the second capacitor. The second power consuming circuitry consumes electrical power at a second voltage. The second power consuming circuitry may comprise one or more electronic components, e.g. analog components such as analog operational amplifiers or comparators, wherein the one or more electronic components are operated at the second voltage.

The first and the second voltage are such that a magnitude of the sum of the first voltage and the second voltage is smaller than or equal to an absolute difference between the high potential and the low potential.

Furthermore, the circuit arrangement comprises voltage setting means which are configured to set a voltage at the first capacitor in accordance to the first voltage and to set a voltage at the second capacitor in accordance to the second voltage. By doing this, the first and the second power consuming circuitry may be provided with electrical power in an energy-efficient and cost-efficient manner.

The voltage setting means may comprise a first voltage limiting element which is arranged in parallel to the first capacitor and/or a second voltage limiting element which is arranged in parallel to the second capacitor. The first voltage limiting element may exhibit a first break-through voltage which corresponds to the first voltage and/or the second voltage limiting element may exhibit a second break-through voltage which corresponds to the second voltage. The voltage limiting elements may each comprise one or more Zener diodes.

The circuit arrangement may further comprise a current source which is configured to generate a current through the first and/or the second voltage limiting element. Alternatively or in addition, the current source may be configured to control a current which is provided to the first power consuming circuitry and to the second power consuming circuitry. The current source may be arranged in series with the serial arrangement of the first voltage limiting element (which is arranged in parallel to the first power consuming circuitry) and the second voltage limiting element (which is arranged parallel to the second power consuming circuitry). As such, the current source may be configured to control an overall current into the circuit arrangement.

The circuit arrangement may comprise means for measuring a current through the first and/or the second voltage limiting element (e.g. using shunt resistors at the first and/or second voltage limiting element). The current source may be configured to control the current which is provided by the current source in dependence on the measured current through the first and/or the second voltage limiting element. In particular, the overall current may be controlled such that the measured current through the first and/or the second voltage limiting element is substantially zero. As such, the power supply for the first and second power consuming circuitry may be provided in an efficient manner.

The voltage setting means may comprise a first voltage regulator which is configured to set a first output voltage at an upper end of the first capacitor. Alternatively or in addition, the voltage setting means may comprise a second voltage regulator which is configured to set a second output voltage at an upper end of the second capacitor, wherein a lower end of the first capacitor is coupled to the upper end of the second capacitor. As such, one or more voltage regulators may be used to set the voltage levels at the first and/or second power consuming circuitry.

A lower end of the second capacitor may be coupled to the second potential and the first voltage regulator and the second voltage regulator may each be arranged between the high potential and the low potential. The first output voltage (which is provided by the first voltage regulator) may be greater than or equal to the sum of the first voltage and the second voltage. The second output voltage (which is provided by the second voltage regulator) may be greater than or equal to the second voltage.

The voltage setting means may comprise a shunt regulator, which is configured to set and/or to limit the voltage at the second capacitor to the second voltage.

Alternatively or in addition, the voltage setting means may comprise a first voltage source and a second voltage source which are arranged in series. The first voltage source may be configured to provide electrical power at the first voltage and/or the second voltage source may be configured to provide electrical power at the second voltage. In addition, the voltage setting means may comprise a first current mirror which is coupled to a high side port of the first voltage source (on one side of the current mirror) and which is coupled to a high side port of the first power consuming circuitry (on another side of the current mirror). Furthermore, the voltage setting means may comprise a second current mirror which is coupled to a high side port of the second voltage source (on one side of the current mirror) and which is coupled to a high side port of the second power consuming circuitry (on another side of the current mirror).

The circuit arrangement may further comprise circuitry which is configured to provide a bi-directional level shift between a first reference level of the first power consuming circuitry and a second reference level of the second power consuming circuitry. The first voltage may be provided relative to the first reference level and/or the second voltage may be provided relative to the second reference level.

According to a further aspect, a method for providing electrical energy to first power consuming circuitry and to second power consuming circuitry is described. The first power consuming circuitry consumes electrical power at a first voltage and the second power consuming circuitry consumes electrical power at a second voltage. The method comprises arranging a first capacitor and a second capacitor in series between a high potential and a low potential, wherein a magnitude of the sum of the first voltage and the second voltage is smaller than or equal to an absolute difference between the high potential and the low potential. Furthermore, the method comprises arranging the first power consuming circuitry in parallel to the first capacitor, and arranging the second power consuming circuitry in parallel to the second capacitor. In addition, the method comprises setting a voltage at the first capacitor in accordance to the first voltage and setting a voltage at the second capacitor in accordance to the second voltage.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term “couple” or “coupled” refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
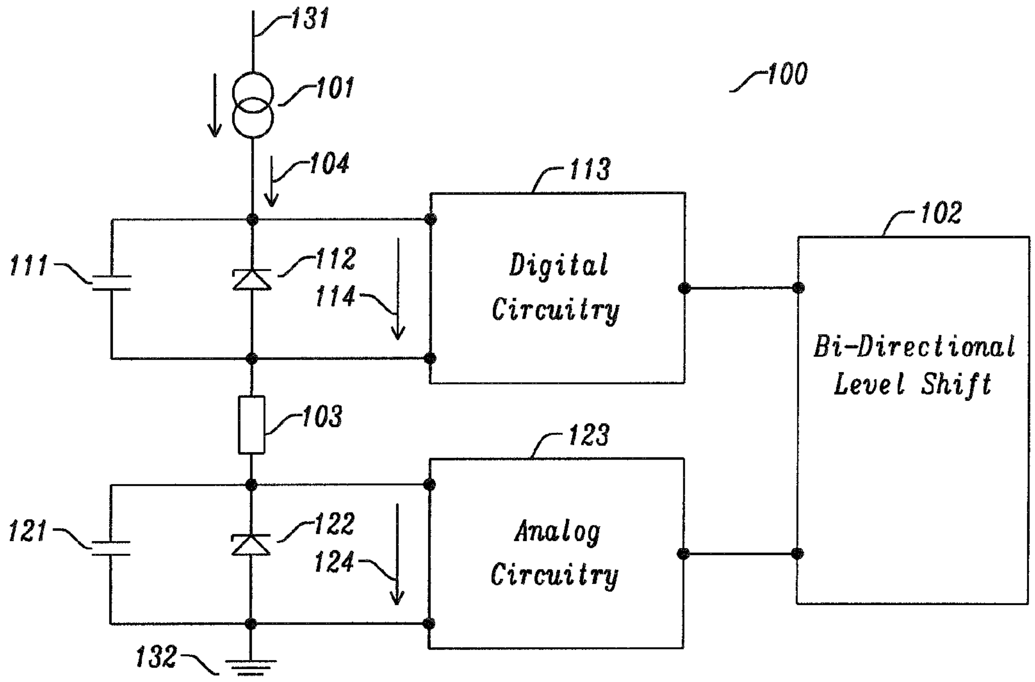
FIG. 1 illustrates a block diagram of an example integrated circuit.

As indicated above, the present document addresses the technical problem of supplying the different functions or circuits of an integrated circuit with electrical power in a power-efficient manner. In this context, FIG. 1 shows a block diagram of an integrated circuit 100 which comprises a digital function or digital circuitry 113 and an analog function or analog circuitry 123. The digital circuitry 113 consumes electrical power at a first voltage 114 and the analog circuitry 123 consumes electrical power at a second voltage 124. The digital circuitry 113 may comprise one or more logic components (e.g. logic gates) and the analog circuitry 123 may comprise one or more analog components (e.g. operational amplifiers or comparators).

The circuit 100 comprises a power supply string which is arranged between a high potential 131 (e.g. the supply voltage Vcc, such as Vcc=12V) and a low potential 132 (e.g. ground). The high potential 131 is also referred to herein as the first potential and the low potential 132 is also referred to herein as the second potential. The power supply string comprises a current source 101 which is configured to control a current 104 through the power supply string. The power supply string further comprises a first Zener diode 112 which is arranged in parallel to the digital circuitry 113 and a second Zener diode 122 which is arranged in parallel to the analog circuitry 123. The Zener diodes 112, 122 exhibit a break-through voltage which corresponds to the first voltage 114 and the second voltage 124, respectively. By doing this, it may be ensured that the correct supply voltage may be set at the respective circuitry 113, 123 in an efficient manner.

Figure 3:
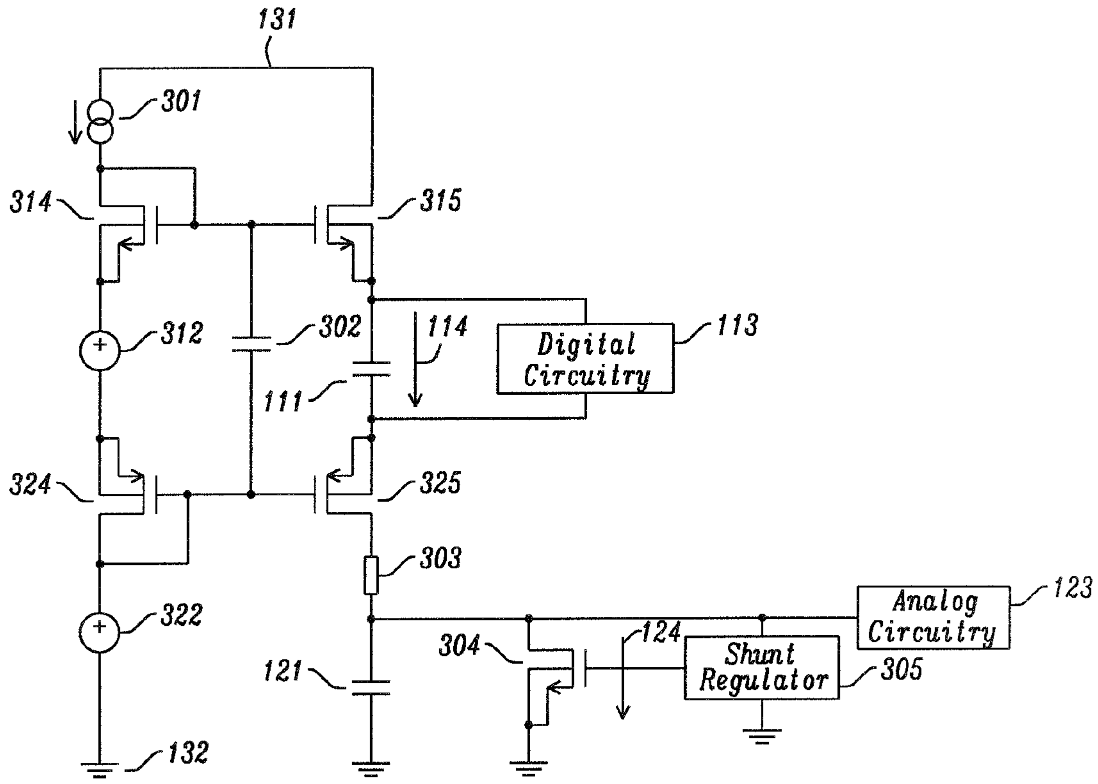
FIG. 3 illustrates a block diagram of an example integrated circuit which comprises a shunt regulator.

In FIG. 3, a first capacitor 111 may be arranged in parallel to the digital circuitry 113 and a second capacitor 121 may be arranged in parallel to the analog circuitry 123. The capacitors 111, 121 may be used to maintain and/or supply the voltages 114, 124 at the circuitry 113, 123, respectively.

The circuit arrangement 100 of FIG. 1 may e.g. be used for LED (light emitting diode) applications and/or for AC charger applications. In such cases, the standby current is typically important. Such a standby current may be reduced using the circuit arrangements which are described in the present document. Furthermore, during normal operation of the circuit arrangement the heat of the integrated circuit (IC) can be reduced by almost a factor 2, thereby reducing the power loss of the circuit arrangement.

As such, FIG. 1 shows two stacked functions 113, 123. The circuit 100 of FIG. 1 makes use of two Zener diodes 112, 122 which are arranged in series with a controlled current source 101. The current source 101 may be controlled by the Zener current through the Zener diodes 112, 122. If a Zener current exceeds an upper or lower current limit, the current of the current source 101 may be reduced or increased, respectively. This may be done in both directions. The current source 101 may be controlled to provide a minimum required current for the circuitry 113, 123.

In other words, the circuit arrangement 100 may comprise means for measuring a current through the first Zener diode 112 and/or through the second Zener diode 122. By way of example, a shunt resistor 103 may be arranged in series with the first Zener diode 112 and/or with the second Zener diode 122 (directly upstream or downstream of the respective diode 112, 122). The voltage drop at such a shunt resistor provides an indication of the current through the respective Zener diodes 112, 122. The current which is provided by the current source 101 may be controlled based on the measured current through the first Zener diode 112 and/or the measured current through the second Zener diode 122. In particular, the current which is provided by the current source 101 may be controlled such that the magnitude of the current through the first Zener diode 112 and/or the current through the second Zener diode 122 is below a pre-determined threshold (e.g. substantially zero). As such, the current into the circuit arrangement 100 may be minimized, thereby minimizing the power losses of the circuit arrangement 100.

Due to the stacked arrangement of the circuitry 113, 123, the current of the stacked top supply consumer 113 can be "re-used" by the stacked bottom supply consumer 123. As a result of this, a reduced overall current consumption and an increased power efficiency of the circuit 100 may be achieved.

The circuit 100 further comprises a bi-directional level shift 102 which is configured to provide a transition from a reference level of the digital circuitry 113 to a reference level of the analog circuitry 123 (and vice versa). As such, the analog circuitry 123 and the digital circuitry 113 are enabled to communicate with one another, even though both circuitries 113, 123 have different reference levels. This may be required, e.g. if a signal which has been measured by the analog circuitry 123 is to be provided to the digital circuitry 113 and/or if a control signal from the digital circuitry 113 is to be provided to the analog circuitry 123. The bi-directional level shift 102 may be configured to offset signals which are to be communicated between the circuitries 113, 123. The offset typically depends on the first voltage 114 and/or the second voltage 124. In particular, the offset may depend on (or may be equal to) the second voltage 124.

Furthermore, FIG. 1 shows an optional decoupling resistor 103.

Figure 2:
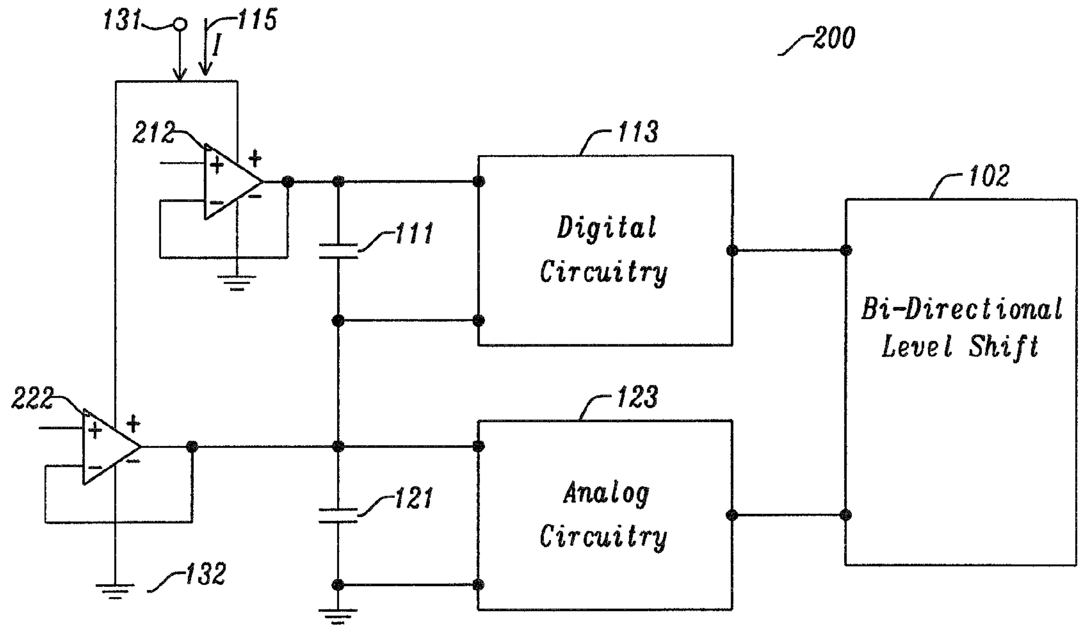
FIG. 2 illustrates a block diagram of another example integrated circuit.

FIG. 2 shows a block diagram of another example circuit 200. In the circuit 200 of FIG. 2 regulators 212, 222 are used to set the voltages 114, 124 at the digital circuitry 113 and at the analog circuitry 123, respectively. In particular, the second regulator 222 may be configured to set as a second output voltage the second voltage 124 at the second capacitor 121 and the first regulator 222 may be configured to set as a first output voltage the sum of the first and second voltage 114, 124, such that the voltage at the first capacitor 111 corresponds to the first voltage 114.

As such, FIG. 2 shows a stacked power supply system which makes use of regulators 212, 222. The regulator 222 at the low potential 132 may be configured to sink and source current.

Both regulators 212, 222 (e.g. operational amplifiers) are coupled to the high potential 131 (e.g. to the supply voltage Vcc). The output voltage of each regulator 212, 222 is fixed (e.g. to the first output voltage or to the second output voltage). The current 115 from the high potential 131 is split to the two different regulators 212, 222. By way of example, if the digital circuitry 113 takes 10 mA (at a first voltage of 2V) and the analog circuitry 123 takes 15 mA (at a second voltage of 5V), the first regulator 212 needs to provide an output current of 10 mA from the high potential 131 and the second regulator 222 needs to provide an output current of 5 mA 15 mA-10 mA). The total current 115 which is required from the high potential 131 is 15 mA, which compares to a total current of 25 mA from the high potential, if both functions 113, 123 are ground related.

Figure 4:
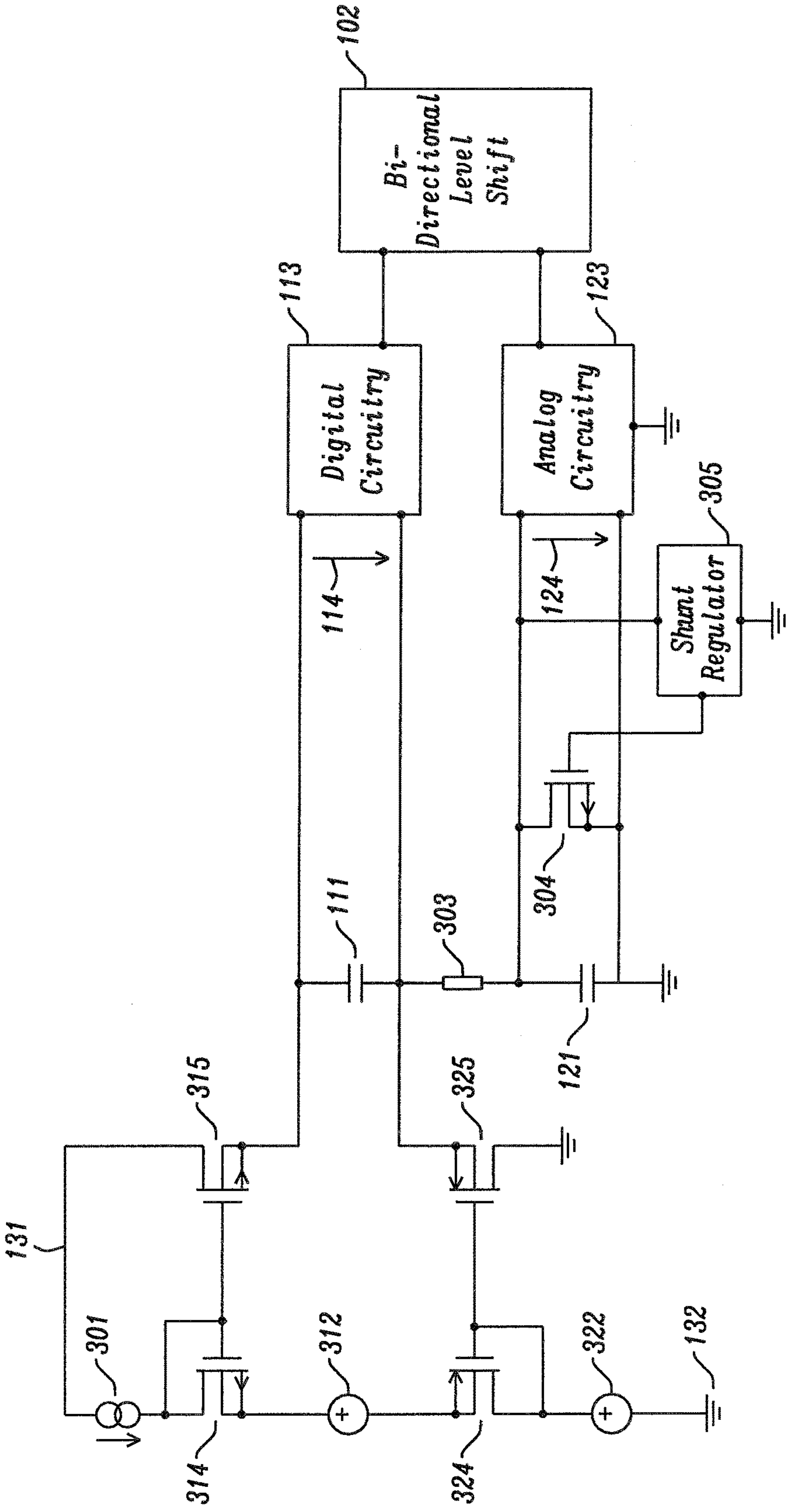
FIG. 4 illustrates a block diagram of another example integrated circuit which comprises a shunt regulator.

FIGS. 3 and 4 show possible implementations for setting the first and second voltages 114, 124 using current mirrors 314, 315 and 324, 325. A current provided by the current source 301 is mirrored onto the power supply string which comprises the first capacitor 111 and the second capacitor 121, as well as an optional decoupling resistor 303. The decoupling or damping resistor 303 may be used for noise reduction between the power supplies for the digital circuitry 113 and for the analog circuitry 123. The first and second voltages 114, 124 are set using the voltage sources 312, 322, respectively. In particular, the first voltage 114 may be set using the first voltage source 312 and the second voltage 124 may be set using the second voltage source 322.

FIGS. 3 and 4 further comprise a shunt regulator 305 which is configured to limit the voltage at the analog circuitry 123 via the transistor 304. In particular, the shunt regulator 305 may ensure that the voltage at the analog circuitry 123 does not exceed the second voltage 124. In addition, FIG. 3 illustrates an optional capacitor 302.

In FIGS. 3 and 4, the transistors 315, 325 act as source followers or as a push pull output stage of a Class AB amplifier. The threshold voltage Vt of the transistors is compensated using the transistors 314, 324. The analog supply to the analog circuitry 123 may be implemented using a shunt regulator 305. The logic supply to the digital circuitry 113 may be adjusted to the required logic supply voltage during operation (e.g. by adjusting the voltage sources 312, 322.

It should be noted that various different numbers of functions 113, 123 may be stacked. Furthermore, additional functions or circuits may be arranged in parallel with respect to one another. In addition, charge balancing, e.g. capacitive balancing, may be used, e.g. by using a capacitive charge pump concept for balancing two or more supplies to two or more circuitries 113, 123.

In any case, the provision of power to a plurality of stacked circuits allows reusing current, thereby reducing the power consumption of an integrated circuit.

Figure 5:
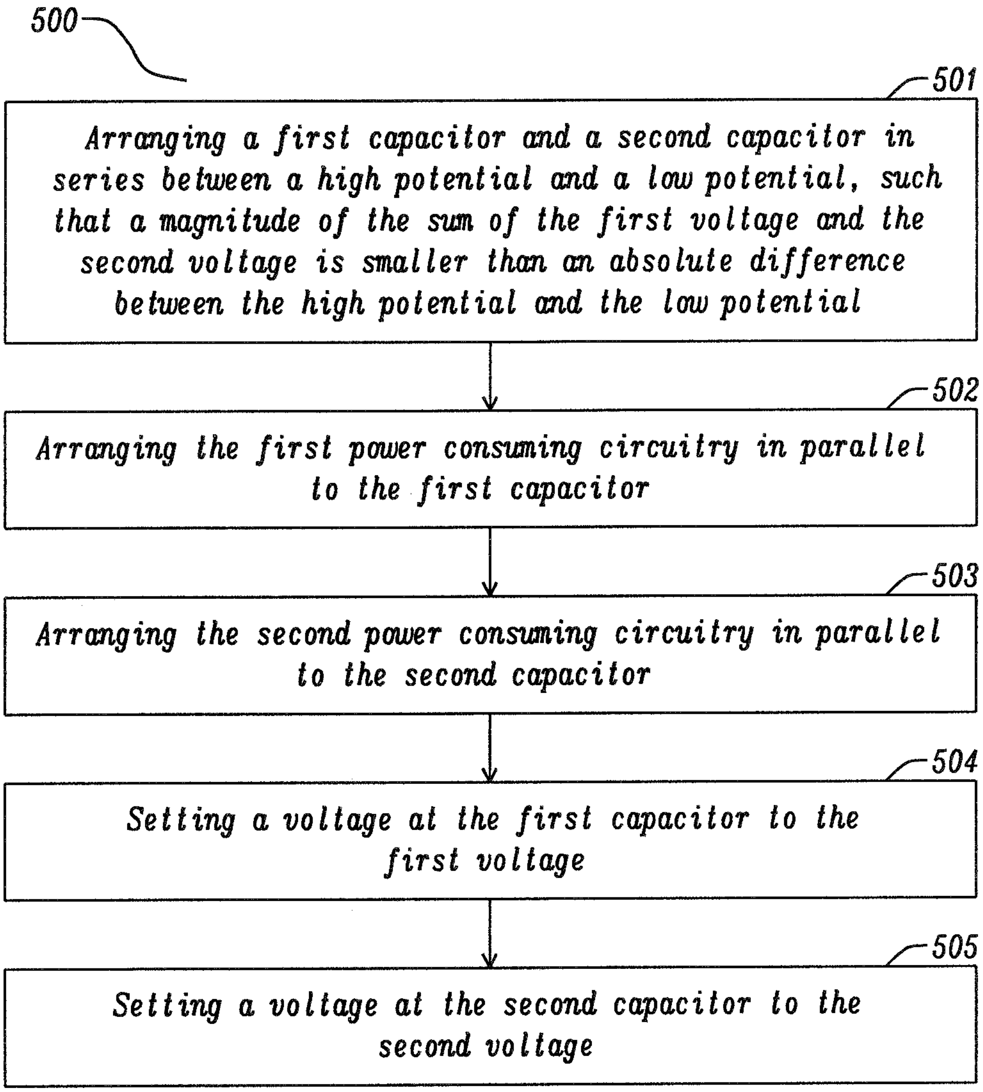
FIG. 5 shows a flow chart of an example method for providing electrical power to first and second power consuming circuitry.

FIG. 5 shows a flow chart of an example method 500 for providing electrical energy to first power consuming circuitry 113 (e.g. to a digital circuit) and to second power consuming circuitry 123 (e.g. to an analog circuit). The first power consuming circuitry 113 consumes electrical power at a first voltage 114 and the second power consuming circuitry 123 consumes electrical power at a second voltage 124. The method 500 comprises arranging 501 a first capacitor 111 and a second capacitor 121 in series between a high potential 131 and a low potential 132, such that a magnitude of the sum of the first voltage 114 and the second voltage 124 is smaller than an absolute difference between the high potential 131 and the low potential 132. Furthermore, the method 500 comprises arranging 502 the first power consuming circuitry 113 in parallel to the first capacitor 111, and arranging 503 the second power consuming circuitry 123 in parallel to the second capacitor 121. In addition, the method 500 comprises setting 504 a voltage at the first capacitor 111 in accordance to the first voltage 114 and setting 505 a voltage at the second capacitor 121 in accordance to the second voltage 124.

Figure 6:
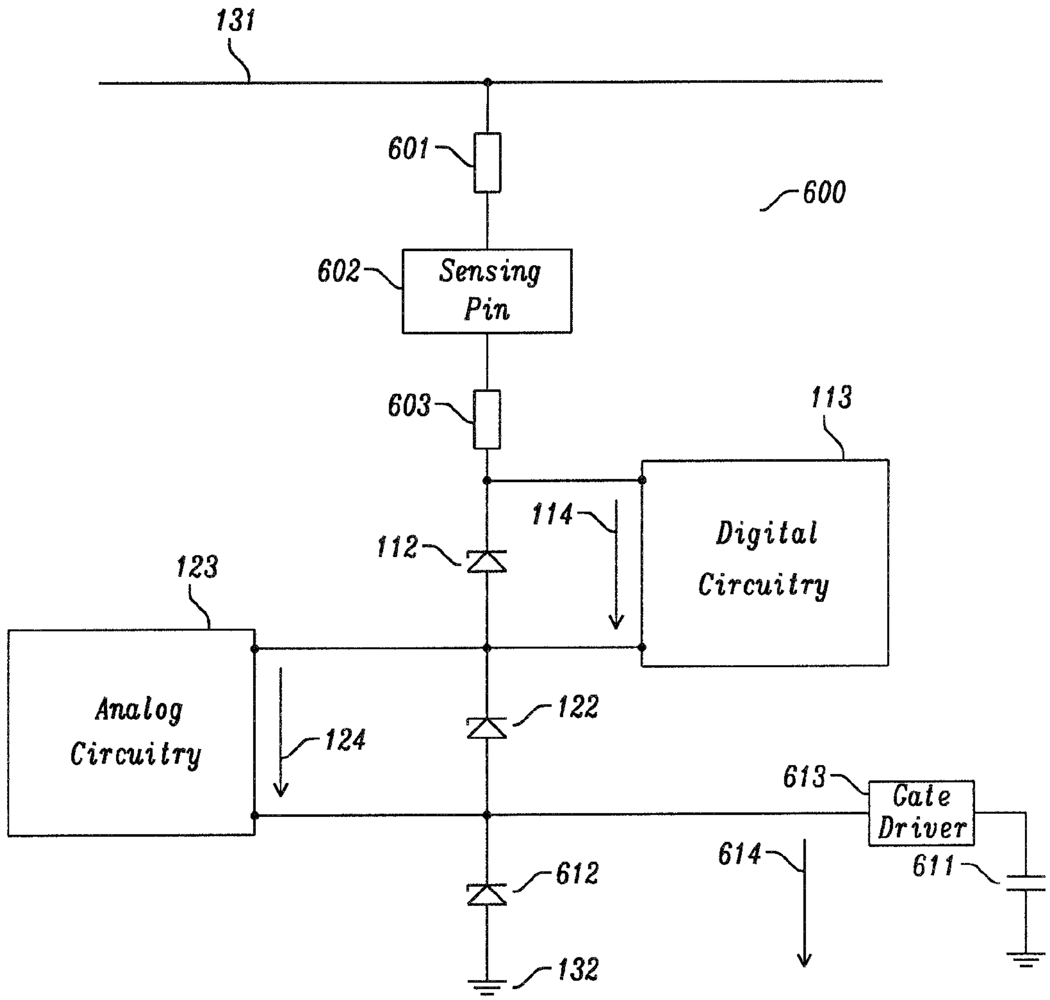
FIG. 6 shows an example power supply string/stacked power supply for supplying power to a plurality of power consuming circuitries.

FIG. 6 shows another example circuit arrangement 600, wherein the supply voltages 114, 124, 614 for different circuitries 113, 123, 613 are derived from the first potential 131 (which may e.g. correspond to the mains voltage). The circuit arrangement 600 comprises a serial arrangement of three Zener diodes 112, 122, 612 for providing the supply voltages 114, 124, 614 for the three different power consuming circuitries 113, 123, 613, respectively. In the illustrated example, the upper power consuming circuitry 113 corresponds e.g. to digital circuitry, the power consuming circuitry 123 corresponds e.g. to analog circuitry and the power consuming circuitry 613 corresponds e.g. to a gate driver (e.g. for driving the gates of LED drive transistors). Furthermore, FIG. 6 shows a third capacitor 611 for the third supply voltage 614.

The circuit arrangement 600 comprises a voltage divider with an upper resistor 601 and a lower resistor 603, as well as an intermediate sensing pin 602 for sensing the current through the power supply string. It can be seen that the difference between the first potential 131 and the second potential 132 is be equal to the voltage drop at the upper resistor 601 plus the voltage drop at the lower resistor 603 and plus the sum of the first voltage 114, the second voltage 124 and the third voltage 614. As such, the resistance of the upper resistor 601 and of the lower resistor 603 may be used to set the current into the power supply string shown in FIG. 6. If additional current is required at the upper port of the first power consuming circuitry 113, additional voltage dividers may be arranged in parallel to the voltage divider 601, 603.

Overall, the present document describes the provision of a stacked power supply for a plurality of stacked circuitries. The stacked circuitries are operated in different voltage domains at different voltage levels. Each circuitry exhibits its own reference potential or ground. Such stacked circuitries may be implemented using triple well technology or isolated transistors. Analog and digital circuitries may be separated by providing the circuitries with dedicated wells.

The provision of a stacked power supply leads to a reduction of current and heat. In other words, the provision of a stacked power supply allows increasing the power efficiency of an integrated circuit.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A circuit arrangement comprising, a first capacitor and a second capacitor which are arranged in series between a high potential and a low potential;

first power consuming circuitry which is arranged in parallel to the first capacitor; wherein the first power consuming circuitry consumes electrical power at a first voltage;

second power consuming circuitry which is arranged in parallel to the second capacitor; wherein the second power consuming circuitry consumes electrical power at a second voltage; wherein a magnitude of the sum of the first voltage and the second voltage is smaller than an absolute difference between the high potential and the low potential; and voltage setting means which are configured to set a voltage at the first capacitor in accordance to the first voltage and to set a voltage at the second capacitor in accordance to the second voltage wherein the voltage setting means comprise a first voltage source and a second voltage source which are arranged in series; wherein the first voltage source is configured to provide electrical power at the first voltage; wherein the second voltage source is configured to provide electrical power at the second voltage;

a first current mirror which is coupled to a high side port of the first voltage source and which is coupled to a high side port of the first power consuming circuitry; and a second current mirror which is coupled to a high side port of the second voltage source and which is coupled to a high side port of the second power consuming circuitry.

2. The circuit arrangement of claim 1, wherein the voltage setting means comprise a shunt regulator, which is configured to set the voltage at the second capacitor to the second voltage.

3. The circuit arrangement of claim 1, further comprising circuitry which is configured to provide a bi-directional level shift between a first reference level of the first power consuming circuitry and a second reference level of the second power consuming circuitry.

4. The circuit arrangement of claim 1, wherein the first power consuming circuitry comprises one or more electronic components which are each operated at the first voltage; and the second power consuming circuitry comprises one or more electronic components which are each operated at the second voltage.

5. The circuit arrangement of claim 1, wherein the first power consuming circuitry comprises one or more digital components; and the second power consuming circuitry comprises one or more analog components.

6. The circuit arrangement of claim 1, wherein the circuit arrangement comprises a driver circuit for a light emitting diode.

7. A method for providing electrical energy to first power consuming circuitry and to second power consuming circuitry; wherein the first power consuming circuitry consumes electrical power at a first voltage; and wherein the second power consuming circuitry consumes electrical power at a second voltage; the method comprising the steps of:

arranging a first capacitor and a second capacitor in series between a high potential and a low potential; wherein a magnitude of the sum of the first voltage and the second voltage is smaller than an absolute difference between the high potential and the low potential;

arranging the first power consuming circuitry in parallel to the first capacitor;

arranging the second power consuming circuitry in parallel to the second capacitor;

setting a voltage at the first capacitor in accordance to the first voltage; and setting a voltage at the second capacitor in accordance to the second voltage providing a first voltage source and a second voltage source which are arranged in series; wherein the first voltage source provides electrical power at the first voltage; wherein the second voltage source provides electrical power at the second voltage;

providing a first current mirror which is coupled to a high side port of the first voltage source and which is coupled to a high side port of the first power consuming circuitry; and providing a second current mirror which is coupled to a high side port of the second voltage source and which is coupled to a high side port of the second power consuming circuitry.

8. The method of claim 7, further comprising the step of:

setting the voltage at the second capacitor to the second voltage by a shunt regulator.

9. The method of claim 7, further comprising the step of:

providing circuitry to provide a bi-directional level shift between a first reference level of the first power consuming circuitry and a second reference level of the second power consuming circuitry.

10. The method of claim 7, wherein the first power consuming circuitry comprises one or more electronic components which are each operated at the first voltage; and the second power consuming circuitry comprises one or more electronic components which are each operated at the second voltage.

11. The method of claim 7, wherein the first power consuming circuitry comprises one or more digital components; and the second power consuming circuitry comprises one or more analog components.

12. The method of claim 7, wherein the circuit arrangement comprises a driver circuit for a light emitting diode.

* * * * *